(12) United States Patent
Ruiz et al.

(10) Patent No.: US 9,709,226 B2
(45) Date of Patent: Jul. 18, 2017

(54) ADHESIVE ACTIVATION SYSTEM FOR ROUNDED SURFACES

(71) Applicant: Flextronics AP, LLC, Broomfield, CO (US)

(72) Inventors: Mario Lopez Ruiz, Jalisco (MX); Victor Najar Estrella, Jalisco (MX)

(73) Assignee: Flextronics AP, LLC, Broomfield, CO (US)

( * ) Notice: Subject to any disclaimer, the term of this patent is extended or adjusted under 35 U.S.C. 154(b) by 324 days.

(21) Appl. No.: 14/554,721

(22) Filed: Nov. 26, 2014

(65) Prior Publication Data

US 2016/0144609 A1 May 26, 2016

(51) Int. Cl.
| | | |
|---|---|---|
| *F21K 99/00* | (2016.01) | |
| *F21K 9/90* | (2016.01) | |
| *B29C 65/00* | (2006.01) | |
| *F21K 9/23* | (2016.01) | |

(52) U.S. Cl.
CPC ............ *F21K 9/90* (2013.01); *B29C 66/5326* (2013.01); *B29C 66/53261* (2013.01); *B29C 66/81423* (2013.01); *B29C 66/81463* (2013.01); *F21K 9/23* (2016.08)

(58) Field of Classification Search
None
See application file for complete search history.

(56) References Cited

U.S. PATENT DOCUMENTS

| | | | |
|---|---|---|---|
| 4,356,619 A | 11/1982 | Snyder et al. | |
| 4,691,419 A | 9/1987 | Keeler et al. | |
| 4,726,114 A | 2/1988 | Staviski | |
| 5,062,201 A | 11/1991 | Long, Jr. | |
| 5,560,531 A | 10/1996 | Ruszowski | |
| 2003/0164077 A1 | 9/2003 | Hill | |
| 2015/0266224 A1* | 9/2015 | Bregonzio | B29C 66/9121 264/171.13 |
| 2015/0359149 A1 | 12/2015 | Itoh | |

FOREIGN PATENT DOCUMENTS

JP     H06-8032    * 2/1994

* cited by examiner

*Primary Examiner* — Barbara J Musser
(74) *Attorney, Agent, or Firm* — Haverstock & Owens LLP (57) ABSTRACT

An adhesive application system for rounded surfaces of a product. The adhesive activation system include a product body having a round outer perimeter, a band configured to fit along the outside of the round outer perimeter, a plurality of pressure pads arranged positioned along a curved pathway, a support configured to hold the product body such that the outer perimeter aligns with the curved pathway and one or more actuators coupled to each of the pressure pads and configured to move the pressure pads between a contracted position wherein curved inner sides of the pressure pads are substantially aligned with the curved pathway and thereby compress the band onto the round outer perimeter and an extended position wherein the curved inner sides are spaced away from the curved pathway.

16 Claims, 5 Drawing Sheets

ADHESIVE ACTIVATION SYSTEM FOR ROUNDED SURFACES

FIELD OF THE INVENTION

The present invention is generally directed to the field of adhesive activation. More specifically, the present invention is directed to activating an adhesive on a rounded surface.

BACKGROUND OF THE INVENTION

Many products require the application of rings or other supporting components to the outside of rounded or non-flat surfaces. Often these supporting components need to be adhered to the rounded surfaces via an adhesive or glue. However, application of the component on these non-flat surfaces is difficult due to their curving surface. Thus, the force required for application of these components is frequently provided through the use of manual application by a user which results in uncontrolled and generally uneven force being supplied to the adhesive while at the same time creating a bottleneck in the manufacturing process due to the manual work. As a result, this can lead a lower product life span and a more expensive product.

SUMMARY OF THE INVENTION

An adhesive application system, method and device. The adhesive application system, method and device is able to comprise a support, one or more application pads and one or more pad actuators that together are able to hold and apply a band to a rounded surface of a product such as an LED light. In particular, the system is able to evenly and uniformly activate an adhesive that couples the band to the rounded surface such that the band or ring is properly adhered to the rounded surface. As a result, the band does not peel off or contain weak points due to uneven adhesive activation that commonly results with manual applications especially on rounded surfaces such as a circle.

A first aspect is directed to an adhesive activation system for rounded surfaces of a product. The system comprises a product body having a round outer perimeter, a band configured to fit along the outside of the round outer perimeter, a plurality of pressure pads arranged positioned along a curved pathway, a support configured to hold the product body such that the outer perimeter aligns with the curved pathway and one or more actuators coupled to each of the pressure pads and configured to move the pressure pads between a contracted position wherein curved inner sides of the pressure pads are substantially aligned with the curved pathway and thereby compress the band onto the round outer perimeter and an extended position wherein the curved inner sides are spaced away from the curved pathway. In some embodiments, the support comprises a lip configured to hold the band along the outside of the round outer perimeter of the product body. In some embodiments, the support comprises a plurality of pins configured to slide within corresponding apertures of the product body while the support holds the product body. In some embodiments, the system further comprises a frame that couples together the pressure pads, the actuators and the support. In some embodiments, the frame comprises a lid and a hinged arm coupled to the lid that is able to rotate about an edge of the frame between an open position wherein the lid is separated from the product body and a closed position wherein the lid contacts the product body such that the product body is unable to move with respect to the support. In some embodiments, at least a portion of the lid configured to slide within a cavity inside the round outer perimeter of the product body when the hinged arm is in the closed position. In some embodiments, the lid comprises an inwardly angled beveled outer edge to facilitate the sliding of the portion of the lid within the cavity. In some embodiments, the band is a ring that fully surrounds the round outer perimeter and the curved pathway forms a full loop. In some embodiments, the band comprises an adhesive distributed along a side facing the round outer perimeter when the band is held along the outside of the round outer perimeter of the product body.

A second aspect is directed to an adhesive activation device for rounded surfaces of a product. The device comprises a plurality of pressure pads arranged positioned along a curved pathway, a support configured to hold the product body such that a round outer perimeter of the product body aligns with the curved pathway and one or more actuators coupled to each of the pressure pads and configured to move the pressure pads between a contracted position wherein curved inner sides of the pressure pads are substantially aligned with the curved pathway and thereby compress a band configured to fit along the outside of the round outer perimeter onto the round outer perimeter and an extended position wherein the curved inner sides are spaced away from the curved pathway. In some embodiments, the support comprises a lip configured to hold the band along the outside of the round outer perimeter of the product body. In some embodiments, the support comprises a plurality of pins configured to slide within corresponding apertures of the product body while the support holds the product body. In some embodiments, the device further comprises a frame that couples together the pressure pads, the actuators and the support. In some embodiments, the frame comprises a lid and a hinged arm coupled to the lid that is able to rotate about an edge of the frame between an open position wherein the lid is separated from the product body and a closed position wherein the lid contacts the product body such that the product body is unable to move with respect to the support. In some embodiments, at least a portion of the lid configured to slide within a cavity inside the round outer perimeter of the product body when the hinged arm is in the closed position. In some embodiments, the lid comprises an inwardly angled beveled outer edge to facilitate the sliding of the portion of the lid within the cavity. In some embodiments, the band is a ring that fully surrounds the round outer perimeter and the curved pathway forms a full loop. In some embodiments, the band comprises an adhesive distributed along a side facing the round outer perimeter when the band is held along the outside of the round outer perimeter of the product body.

A third aspect is directed to a method of activating adhesive on a rounded surface of a product. The method comprises positioning a product body having a round outer perimeter and a band configured to fit along the outside of the round outer perimeter on a support, wherein the support holds the product body such that the outer perimeter aligns with a curved pathway and contracting a plurality of pressure pads arranged positioned along a curved pathway from an extended position to a contracted position around the band and the round outer perimeter with one or more actuators coupled to each of the pressure pads, wherein, when in the contracted position, curved inner sides of the pressure pads are substantially aligned with the curved pathway and thereby compress the band onto the round outer perimeter, and when in the extended position, the curved inner sides are spaced away from the curved pathway. In some embodiments, the support comprises a lip configured to hold the band along the outside of the round outer perimeter of the product body. In some embodiments, the support comprises a plurality of pins configured to slide within corresponding apertures of the product body while the support holds the product body. In some embodiments, a frame that couples together the pressure pads, the actuators and the support. In some embodiments, the frame comprises a lid and a hinged arm coupled to the lid, further comprising rotating the arm about an edge of the frame between an open position wherein the lid is separated from the product body and a closed position wherein the lid contacts the product body such that the product body is unable to move with respect to the support. In some embodiments, at least a portion of the lid configured to slide within a cavity inside the round outer perimeter of the product body when the hinged arm is in the closed position. In some embodiments, the lid comprises an inwardly angled beveled outer edge to facilitate the sliding of the portion of the lid within the cavity. In some embodiments, the band is a ring that fully surrounds the round outer perimeter and the curved pathway forms a full loop. In some embodiments, the method further comprises applying an adhesive along a side of the band that faces the round outer perimeter when the band is held along the outside of the round outer perimeter of the product body.

BRIEF DESCRIPTION OF THE DRAWINGS

Several example embodiments are described with reference to the drawings, wherein like components are provided with like reference numerals. The example embodiments are intended to illustrate, but not to limit, the invention. The drawings include the following figures.

DETAILED DESCRIPTION OF THE EMBODIMENTS

Embodiments of the present application are directed to an adhesive activation system for rounded or round surfaces of a product. The adhesive activation system comprises a product body having a rounded outer perimeter, a band configured to fit along the outside of the rounded outer perimeter, a plurality of pressure pads arranged positioned along a curved pathway, a support configured to hold the product body such that the outer perimeter aligns with the curved pathway and one or more actuators coupled to each of the pressure pads and configured to move the pressure pads between a contracted position wherein curved inner sides of the pressure pads are substantially aligned with the curved pathway and thereby compress the band onto the rounded outer perimeter and an extended position wherein the curved inner sides are spaced away from the curved pathway. As a result, the band does not peel off or contain weak points due to uneven adhesive activation that commonly results with manual applications especially on rounded surfaces such as a circle.

Reference will now be made in detail to implementations of the Adhesive application system as illustrated in the accompanying drawings. The same reference indicators will be used throughout the drawings and the following detailed description to refer to the same or like parts. In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1:
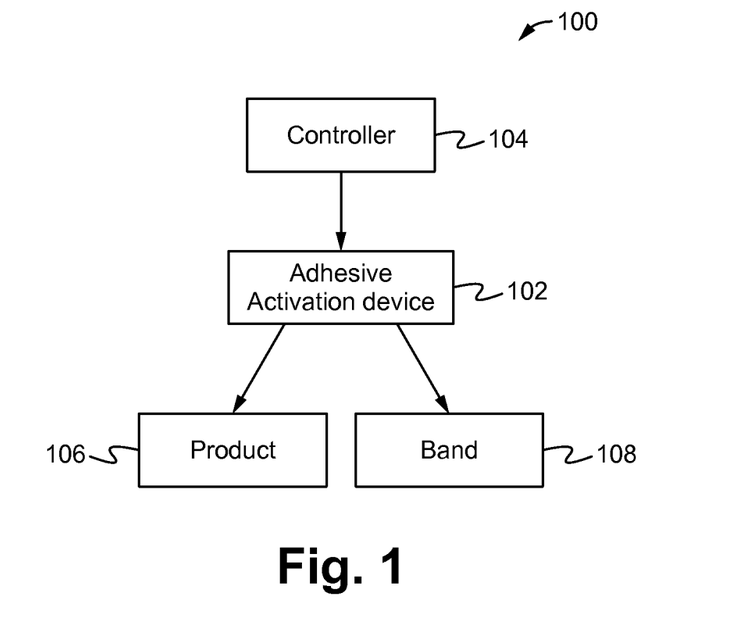
FIG. 1 illustrates an adhesive activation system for rounded surfaces according to some embodiments.

FIG. 1 illustrates an adhesive activation system 100 for rounded surfaces according to some embodiments. As shown in FIG. 1, the system 100 comprises an adhesive activation device 102 communicatively coupled with a controller 104. Specifically, the controller 102 is able to be physically and/or wirelessly coupled to the activation device 102 such that the controller 104 is able to control the operation of the device 102. In some embodiments, the controller 104 is incorporated into the structure of the activation device 102 such that the two form a single integrated device. Alternatively, the controller 104 is able to be a separate device with a separate housing. As also shown in FIG. 1, the system 100 also is able to comprise a product 106 and a band 108 that is to be adhered to the product 106 with the device 102. In particular, the product 106 is able to have an rounded surface, such as a circular frame, wherein the band 108 is able to be coupled to the rounded surface via an adhesive. Further, the product 106 is able to have a body/housing comprising one or more apertures (not shown) for receiving guiding pins of the activation device 102 when coupled to the activation device 102.

Figure 2:
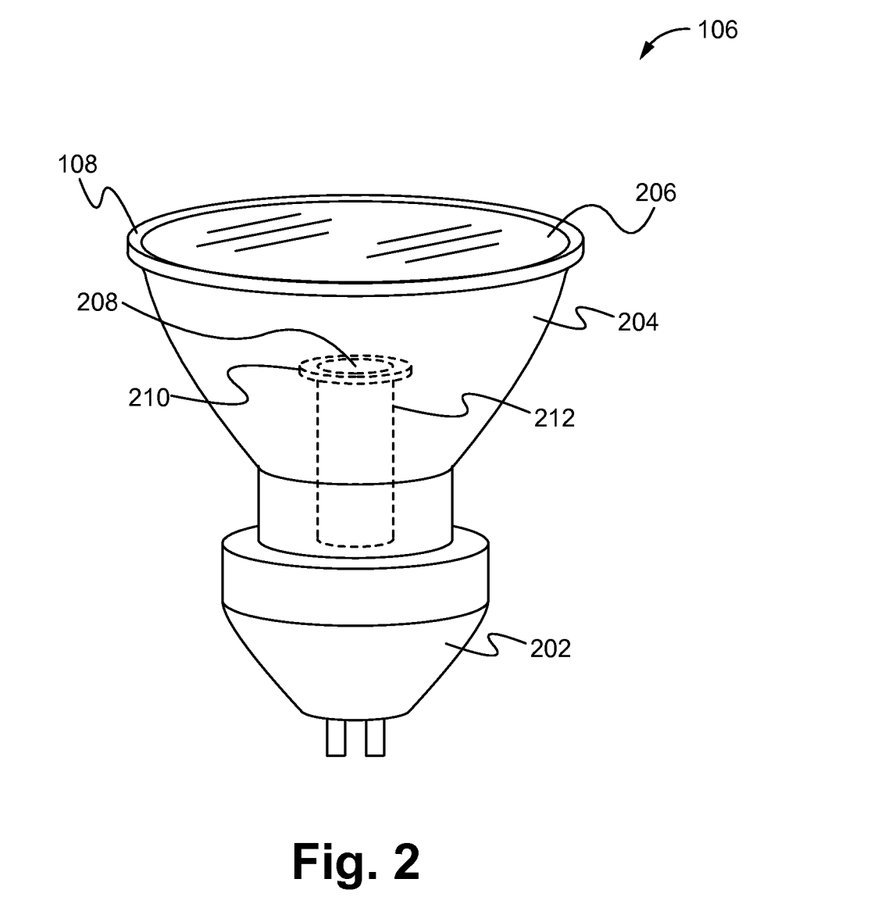
FIG. 2 illustrates a product with an attached band according to some embodiments.

In some embodiments, as shown in FIG. 2, the band 108 is a continuous ring, such as an O-ring, that is able to be adhered to the edge of a product 106, such as a light, in order to protect the edge as well as prevent the edge from cutting a user. Alternatively, the band 108 is able to be discontinuous such that it does not fully extend around the product 106. Both the product 106 and the band 108 are able to be physically coupled with or to the activation device 102 such that the activation device 102 holds the product 106 and the band 108 in place relative to each other and the device 102 while adhesive between the band 108 and the product 106 is activated. In some embodiments, the band 102 is made of an elastic material, such as rubber, so the band 102 is able to flex or bend to better adhere to the product 106. Alternatively, the band 102 is able to be made or other types of flexible materials such as flexible plastics or metals. In some embodiments, the controller 104 comprises a display and/or one or more peripheral devices to display and provide an user interface for controlling the activation device 102. Alternatively, if the controller 104 is incorporated within the activation device 102, the display and/or peripherals are able to be separate from the controller 104. Alternatively, in some embodiments the controller 104 is able to be omitted such that the activation device 102 is directly operated purely manually by an operator.

FIG. 2 illustrates a product 106 with an attached band 108 according to some embodiments. As shown in FIG. 2, the product 106 comprises a lighting device. Alternatively, the product 106 is able to be other types of products having rounded surfaces (such as products with circular or elliptical cross-sections/perimeter dimensions). The lighting device shown in FIG. 2 comprises a base 202, a housing or heat sink structure 204, a lens and/or filter 206, a die 208 (e.g. a light emitting diode die), a die substrate 210 and device circuitry 212 all physically coupled with each other. Alternatively, the device 200 is able to comprise more or less components as are well known in the art. For example, in some embodiments the die 208 and/or die substrate 210 are able to be replaced with a different light source structure such as a filament light structure, a halogen light structure or other types of light source structures known in the art. As a further example, in some embodiments the device 106 is able to comprise a cover or upper housing that surrounds the heat sink structure 204 and/or holds the lens 206 in place relative to the heat sink structure 204 and/or the remainder of the device 106. The base 202 of the device 106 is able to at least partially house and support the device circuitry 212. In some embodiments, the device circuitry 212 is able to comprise power converting circuitry, light intensity adjustment (e.g. dimming) circuitry, control circuitry, battery and/or power source circuitry and/or other types a circuitry for use in lighting devices well known in the art. As described above, in some embodiments the base 202 and/or structure 204 are able to comprise one or more coupling apertures (not shown) for receiving guiding/alignment pins (see FIG. 3) of the adhesive activation device 102 that enable the device 102 to coupled to and/or maintain the alignment of the base 202 and/or structure 204 when applying the band 108 to the structure 204 or other portion of the product 106. For example, the apertures are able to be on the bottom of the base 202 and/or structure 204 such that the base 202 and/or structure 204 is able to slide on top of the support of the activation device 102 while the as the pins slide into the apertures.

In some embodiments, the heat sink structure 204 is positioned adjacent to the lens/filter 206 in order to remove heat emanating from the lens/filter 206. Further, the heat sink structure or housing 204 is able to have a curved or rounded surface, wherein the band 108 is able to couple to the structure 204 at the edge of the rounded surface near the lens 206. Additionally, the heat sink structure 204 is able to house the die 208 and die substrate 210 and couple with the base 202 such that the die 208 is electrically coupled with the device circuitry 212 via the die substrate 210. For example, the die 208 and device circuitry 212 are able to be electrically coupled such that the circuitry 212 is able to provide power to the die 208 for producing light. Additionally, the heat sink structure 204 is able to absorb heat from the die 208 and/or substrate 210 thereby cooling the die 208 and/or substrate 210. The die 208 is able to be physically and/or electrically coupled with the die substrate 210. In some embodiments, the die substrate 210 is an interposer or other flexible substrate. Alternatively, the die substrate 210 is able to be a printed circuit board or other rigid substrate. In any case, the die substrate 210 is able to provide structural support and/or an electrical pathway for electrically coupling the die 208 to other circuitry within the device 106.

Figure 3:
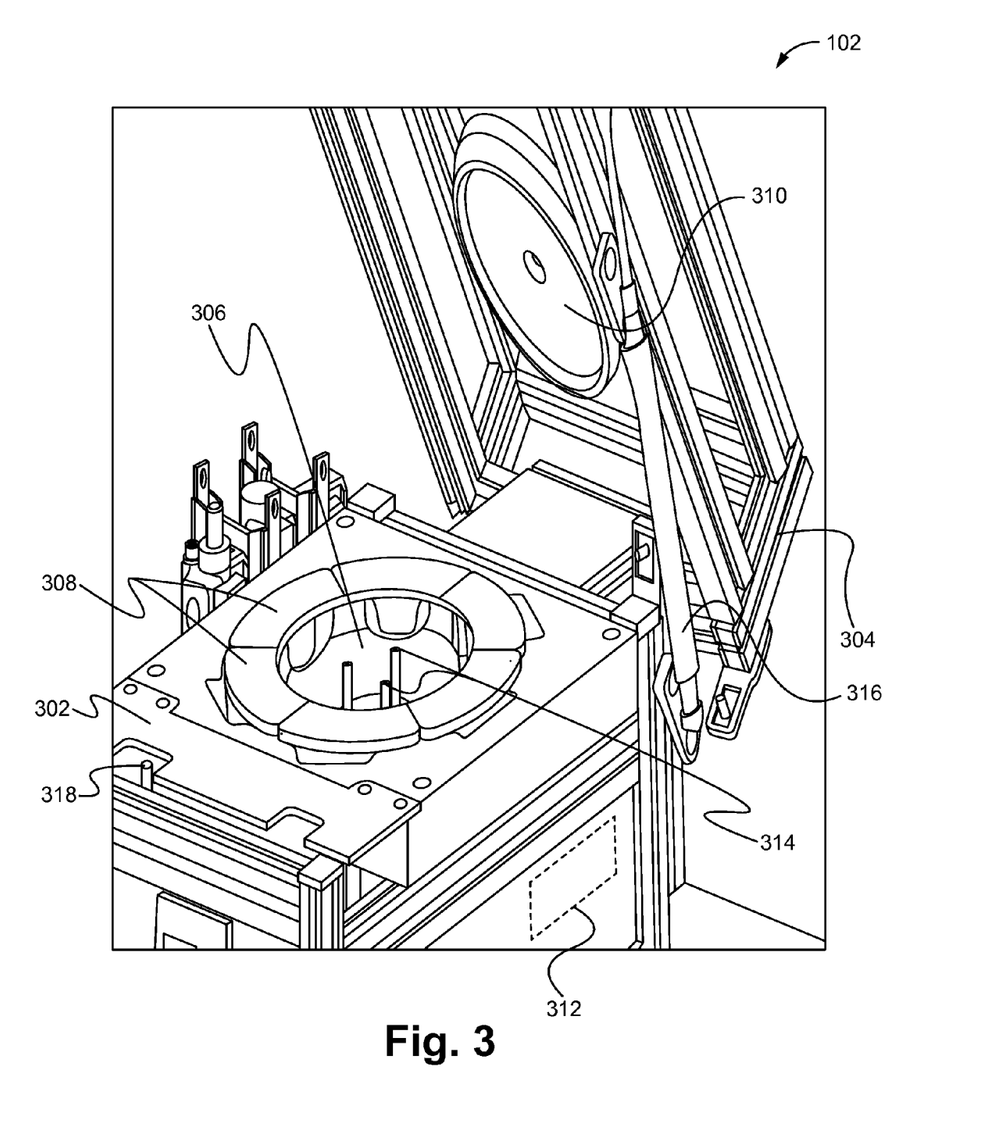
FIG. 3 illustrates a detailed perspective view of the adhesive activation device according to some embodiments.

FIG. 3 illustrates a detailed perspective view of the adhesive activation device 102 according to some embodiments. As shown in FIG. 3, the device 102 comprises a frame 302 having a locking mechanism 318, wherein the frame 302 physically couples together a movable arm 304 having a securing lid 310 and an arm mechanism 316, a product support 306 having one or more alignment pins 314, one or more pads 308 and one or more pad actuators 312.

Although FIG. 3 illustrates a single locking mechanism 318, a single arm 304 having a single lid 310 and single arm mechanism 316, and a single support 306 having three alignment pins 314 and six pads 308, more or less locking mechanisms 318, more or less arms 304 having more or less lids 310 and/or more or less arm mechanisms 316 along with more or less supports 306 having more or less pins 314 and more or less pads 308 are contemplated. In particular, the activation of adhesive on multiple rounded surfaces of multiple products by a single device 102 is able to be accomplished by increasing the quantity of some or all of the above components of the device 102. Alternatively, one or more of the above components are able to be omitted.

The product support 306 and pads 308 are both coupled to the frame 302 such that the inner sides of the pads 308 surround a curved path (e.g. circle, loop, ellipse) adjacent to the support 306 just outside a cavity defined by the support 306. The alignment pins 314 are able to slide into alignment apertures of the product 106 (see FIG. 1) when the product is placed within the cavity of the support 306 in order to ensure that the product is properly oriented within the cavity. The cavity is able to be dimensioned to hold or partially surround the product 106 such that a desired curved outer perimeter/surface of the product 106 protrudes into and aligns with the curved path. For example, the cavity is able to provided vertical and/or lateral support that prevents the product 106 from moving laterally on top of the support 306 such that the curved outer perimeter stays in and aligned with the curved pathway between the pads 308. As a result, when a product 106 is placed within the cavity of the support 306, a curved outer perimeter of the product 106 that protrudes out of the cavity into the curved path is able to be surrounded by the inner sides of the pads 308. Thus, when a band 108 is positioned on the curved outer perimeter/surface about or around the curved path (as filled by the curved outer perimeter), the pads 308 are able to push the band 108 against the curved outer perimeter of the product 106 by contracting toward the curved path from an extended position to a contracted position. In the reverse manner, the pads 308 are able to release the band 108 and/or product 106 by moving away from the curved path. In some embodiments, the support 306 is able to further comprise a lip for holding the band 108 in place with respect to the rounded surface of the product 106 when positioned within the device 102. For example, the lip is able to be under and/or around the curved path for holding the band 108 around the outer perimeter of the product 106 about the curved path.

The one or more actuators 312 are physically coupled to the pads 308 such that the actuators 312 are able to move the pads 308 between the contracted and extended positions about the curved path. In some embodiments, the actuators 312 are able to selectively move the pads 308 to any point between the contracted position and the extended position. Alternatively, the actuators 312 only move the pads 308 to the endpoints of the contracted and the extended position. In some embodiments, the actuators 312 move all of the pads 308 between the positions simultaneously. As a result, it can be ensured that all the pads 308 apply the same amount of pressure at the same time to the band 108 in order to uniformly activate the adhesive. Alternatively, one or more of the pads 308 are able to be moved by the actuators 312 independent of one or more of the other pads 308. In particular, the controller 104 is able to be configured to control the pads 308 independently or in concert. In some embodiments, a single actuator 312 is operatively coupled to all of the pads 308. Alternatively, each pad 308 is able to be operatively coupled to a separate actuator 312 and/or one or more of the actuators 312 are able to be operatively coupled to a plurality (but not all) of the pads 308 for moving the pads into the desired positions. The pad actuators 312 are able to be coupled with the controller 104 such that the controller 104 is able to control the movement of the pads 308 between the contracted and extended positions by issuing commands to the actuators 312. In some embodiments, the actuators are pneumatic. Alternatively, the actuators are able to be hydraulic, pneumatic and/or other types of actuators as are known in the art. In some embodiments, when in the contracted position, the inner side of the pads 308 (which are able to be perpendicular to the motion of the pads between the extended and retracted position) form a loop (e.g. a circle) that matches or is congruent with the curved pathway and/or the outer perimeter of the product 106. Further, the pads 308 are able to contact each other in the contracted position such that the ends of the inner side of one pad 308 abuts the ends of the inner sides of the pads 308 that straddles the one pad 308.

The movable arm 304 is able to be coupled to the frame 302 via a hinge that enables the arm 304 to rotate about the hinge between a closed position and an open position. In the closed position the securing lid 310 is pressed against the top and/or inside of the product 106 and/or band 108 in order to keep the product 106 and/or band 108 from moving while the pads 308 contract to activate the adhesive. In the open position the arm 304 is rotate away from the frame 302 such that the securing lid 310 no longer presses against the product 106 and/or band 108 which are then able to be removed. One or more arm mechanisms 316 are able to couple between the frame 302 and the arm 304 and provide the opening and closing force that moves the arm 304 about the hinge. In particular, in some embodiments the arm 304 is able to be coupled with the controller 104 such that the controller 104 is able to control the movement of the arm 304 and/or lid 310 between the open and closed positions by issuing commands to the arm mechanism 316. For example, the controller 104 is able to automatically open the arm 304 via the arm mechanism 316 when the adhesive activation is complete so that the product 106 is able to be removed from the support 306. Alternatively, the arm mechanisms 326 are able to be omitted and/or the arm 304 is able to be moved manually by an operator between the open and closed positions. Alternatively, the movable arm 304 is able to be coupled to the frame 302 via a different type of movable securing mechanism as are well known in the art.

The lid 310 is able to have a cross-section or profile the perimeter of which matches or is congruent with the curved pathway, the cavity of the support 306 and/or the outer perimeter of the product 106. As a result, it is ensured that the perimeter of the lid 310 is able to properly contact and press down on some or the entirety of the band 108 and/or the portion of the product 106 that protrudes into and/or aligns with the curved path above the cavity. In some embodiments, the lid 310 comprises a beveled edge that angles inward toward the center of the lid 310. When moving from the open position to the closed position, this beveled edge aids the lid 310 in pressing on top of and/or sliding within some or the entirety of the band 108 and/or the portion of the product 106 that protrudes into and/or aligns with the curved path above the cavity. Alternatively, the beveled edge is able to be omitted. In some embodiments, the locking mechanism 318 is able to releasably lock the arm 304 in the closed position so that the arm 304 is not inadvertently opened before the activation operation is finished. Specifically, the locking mechanism 318 is able to be coupled to and/or controlled by the controller 102 either automatically or based on user commands. For example, the controller 102 is able to automatically lock the arm 304 in place with the locking mechanism 318 before the adhesive activation is begun (e.g. the pads 308 have not yet been contracted) and/or automatically unlock the arm 304 after the adhesive activation has finished (e.g. the pads 308 have been moved to the extended position). Alternatively, the locking mechanism 318 is able to manually be locked and unlocked or be omitted entirely. In some embodiments, the pads 308 and/or lid 310 are able to be made of rubber. Alternatively, the pads 308 and/or lid 310 are able to be made of other types of flexible material such as certain plastics.

Figure 4A:
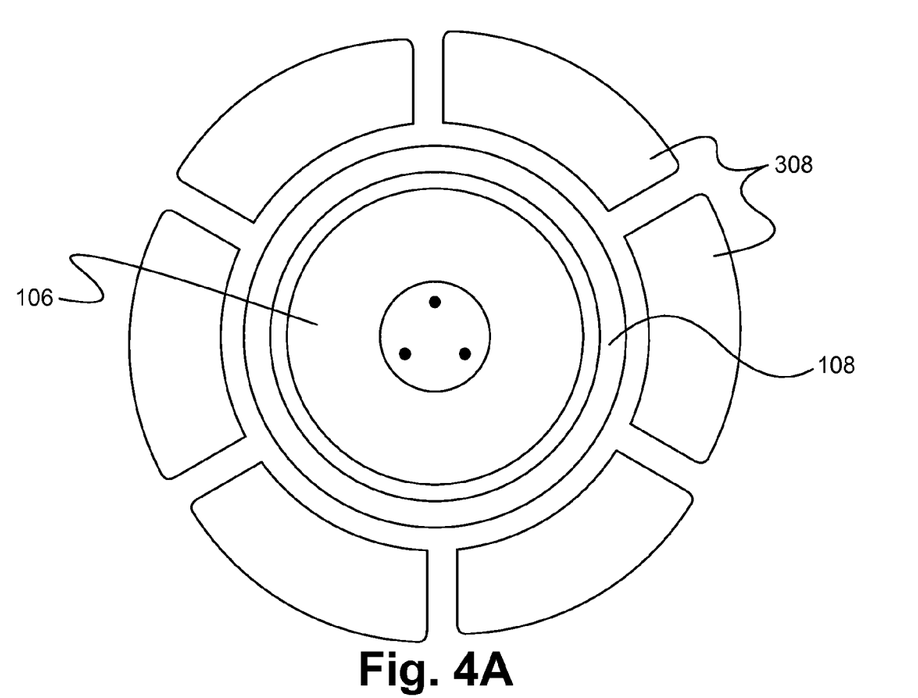
FIGS. 4A and 4B illustrate simplified top views of the pads, the product and the band in the contracted and extended positions according to some embodiments.
Figure 4B:
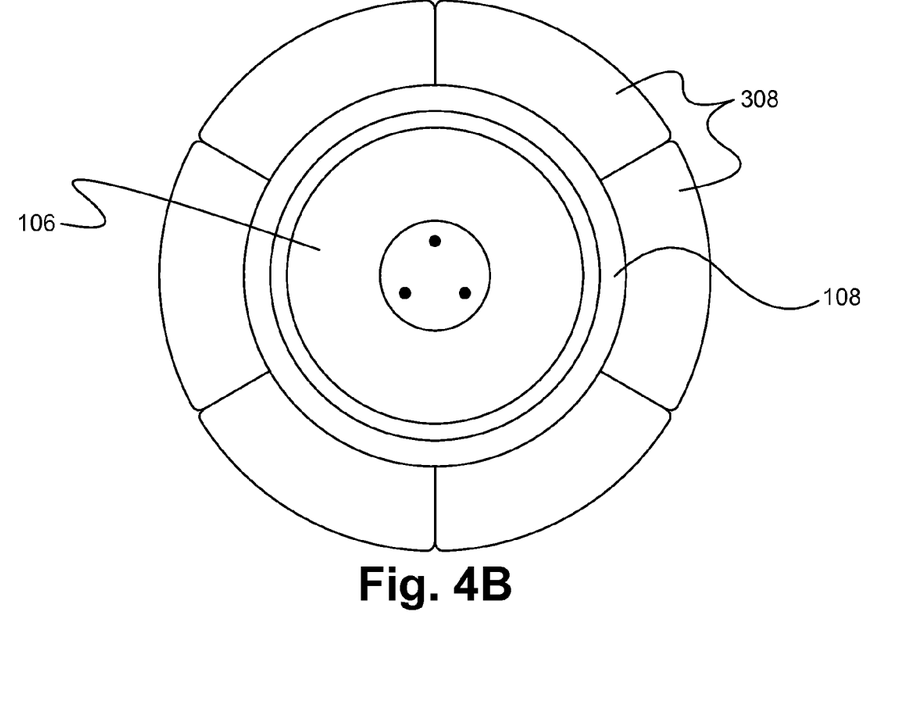

FIGS. 4A and 4B illustrate simplified top views of the pads 308, the product 106 and the band 108 in the contracted and extended positions according to some embodiments. As shown in FIG. 4A, when in the extended position, the pads 308 are spaced away from the band 108 and/or the rounded edge of the product 106 enabling the product 106 and/or the band 108 to be placed and secured on the support 310 with the adhesive in between the two ready to be activated. As shown in FIG. 4B, when in the contracted position, the pads 308 each move towards the band 108 and/or product 106 thereby making contact with the band 108 and applying an even pressure to the band 108 toward the rounded surface of the product 106 such that the adhesive between the band 108 and the product 106 is evenly activated coupling the band 108 and the rounded surface of the product 106 together. In some embodiments, the adhesive is applied to the entire area between the band 108 and the rounded surface of the product 106. Alternatively, less than the entire area is able to receive adhesive, such as, at predefined intervals along the band 108. For example, less adhesive is able to be used with the understanding that the pressure applied between the band 108 and the rounded surface by the pads 308 will cause the adhesive to spread out and cover a greater portion of the area than that to which the adhesive was initially applied.

Figure 5:
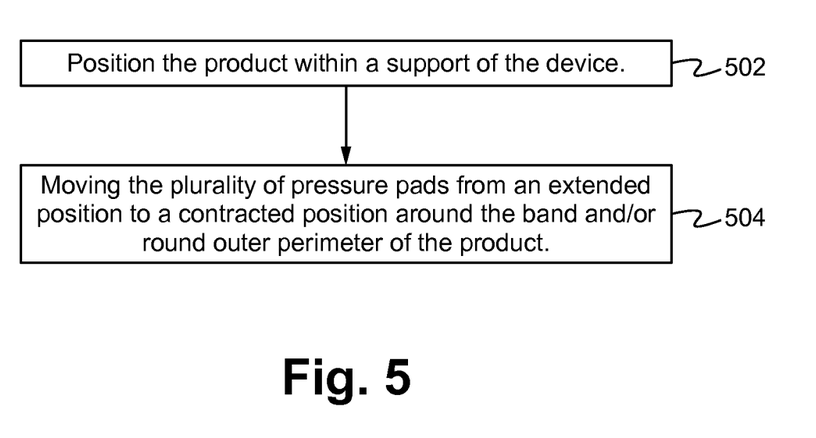
FIG. 5 illustrates a method of operating an adhesive activation device according to some embodiments.

FIG. 5 illustrates a method of operating an adhesive activation device according to some embodiments. At the step 502, the product 106 is positioned within a support 306 of the device 102. In some embodiments, the band 108 is placed on a rounded perimeter of the product 106 with an adhesive before the product 106 is positioned on the support 306. Alternatively, the band 108 is placed on a rounded perimeter of the product 106 with or without the adhesive before or after the product 106 is positioned on the support 306. In some embodiments, positioning the product 106 within the support 306 comprises sliding one or more pins of the support 306 into one or more apertures of the product 106 for securing the alignment of the product 106 within the support 306. Alternatively or in addition, positioning the product 106 within the support 306 comprises securing a fastening mechanism to the product 106 that prevents the product from detaching from the support 306. As a result, the support 306 is able to hold the product body and/or the band 108 such that the outer perimeter of the product body aligns with a curved pathway of the adhesive activation device 102. At the step 504, the plurality of pressure pads 308 are moved from an extended position to a contracted position around the band 108 and/or rounded outer perimeter of the product 106 thereby activating the adhesive by providing a uniform force pushing the band 108, the product 106 and the adhesive between them together. As a result, the method provides the advantage of ensuring the uniform activation of the adhesive and thus the uniform adhesion of the band 108 to the product 106.

In some embodiments, when in the contracted position the pads 308 are positioned such that their inner side is aligned with the curved pathway. Alternatively, in the contracted position the inner side of the pads 308 are able to move within the curved pathway or outside of the curved pathway. In some embodiments, when in the contracted position the inner side of the pads 308 (which are able to be perpendicular to the motion of the pads between the extended and retracted position) form a loop (e.g. a circle) that matches or is congruent with the curved pathway and/or the outer perimeter of the product 106. Further, the pads 308 are able to contact each other in the contracted position such that the ends of the inner side of one pad 308 abuts the ends of the inner sides of the pads 308 that straddles the one pad 308. In some embodiments, the method further comprises closing the arm 304 on top of the support 306, product 106 and/or band 108 such that the lid 310 contacts the product 106 and/or band 108 and holds the product 106 and/or band 108 in place as the pads 308 are moved to the contracted position. In some embodiments, at least a portion of the lid 310 is able to be slid within a cavity inside the rounded outer perimeter of the product body 106 when the hinged arm 304 is in the closed position. In some embodiments, the method further comprises applying an adhesive along a side of the band 108 that faces the rounded outer perimeter of the body 106 when the band 108 is held along the outside of the rounded outer perimeter of the product body 106 by the support 306. Alternatively, one or more of the above method actions are able to be omitted and/or additional steps are able to be added.

The adhesive activation device, system and method described herein has numerous advantages. Specifically, it provides the benefit of enabling the band does not peel off or contain weak points due to uneven adhesive activation that commonly results with manual applications especially on rounded surfaces such as a circle. Further, it provides the advantage of securing the product with respect to the band and the activation device via the support and/or the lid such that the band and/or product do not slip out of place during the activation process. Thus, the adhesive activation device, system and method described herein has numerous advantages.

The present application has been described in terms of specific embodiments incorporating details to facilitate the understanding of the principles of construction and operation of the power converter. Many of the components shown and described in the various figures can be interchanged to achieve the results necessary, and this description should be read to encompass such interchange as well. As such, references herein to specific embodiments and details thereof are not intended to limit the scope of the claims appended hereto. It will be apparent to those skilled in the art that modifications can be made to the embodiments chosen for illustration without departing from the spirit and scope of the application.

What is claimed is:

1. An adhesive activation system for rounded surfaces of a product, the system comprising:
   a product body having a round outer perimeter;
   a band configured to fit along the outside of the round outer perimeter;
   a plurality of pressure pads arranged positioned along a curved pathway;
   a support configured to hold the product body such that the outer perimeter aligns with the curved pathway, wherein the support comprises a lip configured to hold the band along the outside of the round outer perimeter of the product body; and
   one or more actuators coupled to each of the pressure pads and configured to move the pressure pads between a contracted position wherein curved inner sides of the pressure pads are substantially aligned with the curved pathway and thereby compress the band onto the round outer perimeter and an extended position wherein the curved inner sides are spaced away from the curved pathway.

2. The system of claim 1 wherein the support comprises a plurality of pins configured to slide within corresponding apertures of the product body while the support holds the product body.

3. The system of claim 2 further comprising a frame that couples together the pressure pads, the actuators and the support.

4. The system of claim 3 wherein the frame comprises a lid and a hinged arm coupled to the lid that is able to rotate about an edge of the frame between an open position wherein the lid is separated from the product body and a closed position wherein the lid contacts the product body such that the product body is unable to move with respect to the support.

5. The system of claim 4 wherein at least a portion of the lid configured to slide within a cavity inside the round outer perimeter of the product body when the hinged arm is in the closed position.

6. The system of claim 5 wherein the lid comprises an inwardly angled beveled outer edge to facilitate the sliding of the portion of the lid within the cavity.

7. The system of claim 6 wherein the band is a ring that fully surrounds the round outer perimeter and the curved pathway forms a full loop.

8. The system of claim 7 wherein the band comprises an adhesive distributed along a side facing the round outer perimeter when the band is held along the outside of the round outer perimeter of the product body.

9. An adhesive activation device for rounded surfaces of a product, the device comprising:
   a plurality of pressure pads arranged positioned along a curved pathway;
   a support configured to hold the product body such that a round outer perimeter of the product body aligns with the curved pathway, wherein the support comprises a lip configured to hold the band along the outside of the round outer perimeter of the product body; and
   one or more actuators coupled to each of the pressure pads and configured to move the pressure pads between a contracted position wherein curved inner sides of the pressure pads are substantially aligned with the curved pathway and thereby compress a band configured to fit along the outside of the round outer perimeter onto the round outer perimeter and an extended position wherein the curved inner sides are spaced away from the curved pathway.

10. The device of claim 9 wherein the support comprises a plurality of pins configured to slide within corresponding apertures of the product body while the support holds the product body.

11. The device of claim 10 further comprising a frame that couples together the pressure pads, the actuators and the support.

12. The device of claim 11 wherein the frame comprises a lid and a hinged arm coupled to the lid that is able to rotate about an edge of the frame between an open position wherein the lid is separated from the product body and a closed position wherein the lid contacts the product body such that the product body is unable to move with respect to the support.

13. The device of claim 12 wherein at least a portion of the lid configured to slide within a cavity inside the round outer perimeter of the product body when the hinged arm is in the closed position.

14. The device of claim 13 wherein the lid comprises an inwardly angled beveled outer edge to facilitate the sliding of the portion of the lid within the cavity.

15. The device of claim 14 wherein the band is a ring that fully surrounds the round outer perimeter and the curved pathway forms a full loop.

16. The device of claim 15 wherein the band comprises an adhesive distributed along a side facing the round outer perimeter when the band is held along the outside of the round outer perimeter of the product body.

\* \* \* \* \*